United States Patent [19]

Cameron

[11] 4,012,961
[45] Mar. 22, 1977

[54] PULLEY AND SUPPORT COMBINATION

[75] Inventor: John Kent Cameron, Warwick, R.I.

[73] Assignee: Kenney Manufacturing Company, Warwick, R.I.

[22] Filed: Jan. 15, 1976

[21] Appl. No.: 649,370

[52] U.S. Cl. .......................... 74/230.7; 29/159 R; 74/230.3

[51] Int. Cl.[2] ................. F16H 55/48; F16H 55/36; B21D 53/26; R21K 1/28

[58] Field of Search .............. 74/446, 230.7, 230.3, 74/230.01; 29/159 R

[56] References Cited

UNITED STATES PATENTS 3,785,217  1/1974  Peura .............................. 74/230.3

*Primary Examiner*—Leonard H. Gerin
*Attorney, Agent, or Firm*—Russell & Nields

[57] ABSTRACT

A self centering pulley particularly suitable for drapery traverse rods is made of molded plastic and is provided with an inner generally cylindrical male race member and a mating outer female race member. Self centering is accomplished by dimensioning the male race to extend axially outward of and beyond the sides of the female race in both directions and providing the male race with an inward taper so as to contact the female race only at its outer edges on each side when the races are centered. A retaining bead is provided centrally of one race to interlock with a similarly located groove on the other race so as to limit axial relative motion between the race members. Only the male race member needs to be secured to a supporting structure.

6 Claims, 1 Drawing Figure

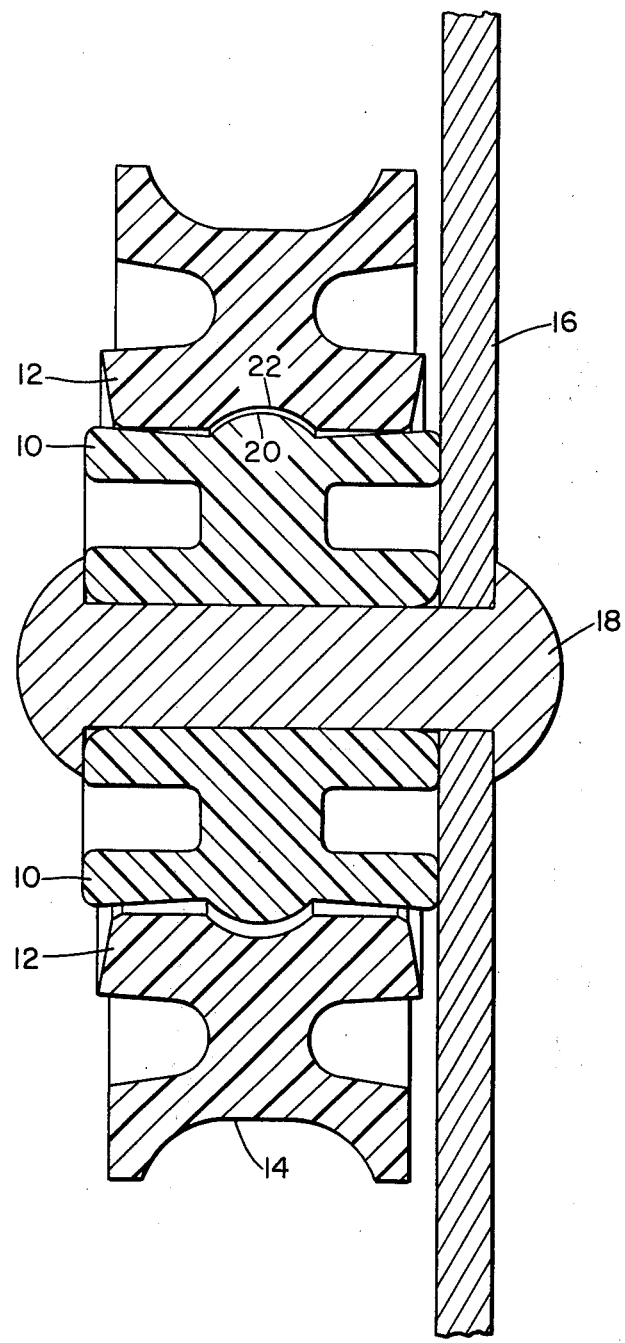

PULLEY AND SUPPORT COMBINATION

BACKGROUND OF THE INVENTION

This invention relates to pulleys and more particularly to molded plastic pulleys. One use for which the pulley of the present invention is particularly well suited is in drapery traverse rods. It will be understood that, in the context of drapery traverse rods, various special criteria are imposed. Thus, the pulley or sheave must operate smoothly, easily, and relatively silently. In addition it must be inexpensive not only with respect to its basic cost of manufacture, but also in its ease of assembly in the traverse rod. Of course, durability and maintenance-free operation are also important criteria.

Plastic materials having a wax-like surface such as Nylon, Teflon, polypropylene, polyethylene and the like are known to be suitable for molded bearings due to their respective low coefficients of friction, and although they are somewhat elastic, they are sufficiently rigid for light load conditions of this sort. On the other hand, molding bearing races out of such materials, presents certain problems which are accentuated in the drapery hardware context. Thus, if a split mold is employed a parting or "flash" line will appear on the molded article. Such a flash line can be objectionable unless great care is taken to minimize it, and the flash should not appear to any significant degree on either of the mating bearing surfaces. In the conventional practice, therefore, one procedure has been to mold smooth, completely cylindrical bearing members with the mold parting lines located along the ends of the cylinders. Thus, in one commercially available arrangement, a cylindrical sleeve serving as an inner bearing race is mounted on a pin, and the pulley is provided with an inner cylindrical bore serving as the outer race of the bearing. There are several disadvantages, however, of such a construction. In the first place, the mating cylindrical bearing surfaces provide no means for limiting axial relative motion between the pulley and the sleeve. Thus the pulley must be mounted in an outer case which keeps the pulley in the correct position on the inner race. In such an arrangement, however, the sides of the pulley rub against the walls of the pulley case, and increase both the friction and the noise. Another disadvantage is in the assembly of the various components. In one known form of such a pulley and case combination, the pulley case, the sleeve and the pulley are all made of separate molded plastic components. The pulley case is provided with opposed walls joined only at one end, and with short pins or stubs protruding from the opposed walls toward each other and in axial alignment. The pulley is assembled by pulling the walls of the pulley case apart (they being sufficiently flexible for this), snapping the sleeve onto one of the pin stubs, and then closing the pulley case so that the other stub snaps into the other end of the sleeve. Needless to say, the mold for such a pulley case is complex and expensive, and the number of parts and number of steps involved in its assembly all add to the expense. In addition, once the pulley is properly mounted in the case, additional steps are required to mount the case in one end of the traverse rod.

Accordingly, it is a general object of the present invention to provide an inexpensive molded plastic pulley which is self centering in operation and in which means are provided between the mating components of the bearing itself to restrain the bearing races against axial relative motion. Another object is to provide a pulley meeting the foregoing general object and which is also inexpensive to install in an article such as a drapery traverse rod.

BRIEF SUMMARY OF THE INVENTION

In the accomplishment of these and other objects of the invention, in a preferred embodiment thereof, I mold an outer female race member, and an inner male race member out of Nylon. The outer race member serves as the pulley or sheave, and is therefore provided with a groove on its outer surface to receive a flexible element such as a curtain draw cord. The inner race member is secured to a base and supports the outer race pulley member. Self centering is accomplished by extending the inner race member axially beyond each end of the outer race member and inwardly tapering the inner race member from each end so that only the lateral edges of the outer race member contact the inner race member when the two race members are centered. In this way, when the two race members are off center, the outer race member bears primarily only on one end of the inner race member and the inward slope of the taper on the inner race causes the outer race to move toward the center position. A certain amount of free axial relative motion between the two race elements is permitted but is ultimately limited by a mating bead and groove arrangement located centrally between the mating race members. It is a feature of my invention that the pulley can be supported merely by riveting (or otherwise fixing) the inner male race member to a base or supporting wall, and the pulley will operate satisfactorily without rubbing against the wall. Thus, assembly into an article such as a drapery traverse rod is extremely easy, and does not require a separate pulley case. Another feature of my invention is that the inner male race member may be molded in a two part mold with the parting line of the mold located along the center axial motion limiting bead, and that such flash as may appear along that bead has no adverse effect on the action of the bearing because the bead itself does not serve as one of the bearing surfaces.

BRIEF DESCRIPTION OF THE DRAWINGS

The single FIGURE is a cross sectional view in side elevation of the pulley of the present invention mounted on a supporting base.

DESCRIPTION OF PREFERRED EMBODIMENTS

The preferred embodiment herein illustrated comprises an inner male race member 10 and an outer female race member 12 both of which are generally cylindrical in shape and are molded out of a plastic having a waxy surface such as Nylon, polypropylene, polyethylene or the like. The outer member 12 serves as a pulley or sheave and therefore is provided with a groove 14 on its outer surface to receive a flexible element such as a drapery draw cord.

The outer member 12 is provided with a generally cylindrical center bore into which the inner member 10 fits. The inner member 10 is axially longer than the outer member 12 and extends outwardly therefrom at each end. In addition, the outer surface of the inner member 10 is inversely tapered toward the mid portion or center line; that is, the diameter of the inner member 10 is longer at each end and is tapered to a smaller diameter toward the mid portion or center line. The inner surface of the outer member 12 is essentially cylindrical and therefore it only contacts the inner member 10 at its outer edges when the members 10 and 12 are centered. When the members 10 and 12 are off center, the outer member takes a higher position on the taper on the side toward which it is off center, and the force on the pulley then tends to make the pulley member 12 ride down the taper toward the centered position at which contact is made at the same level on the tapers at each end. In the single FIGURE, I have shown the members 10 and 12 only in the centered position and with the member 10 attached to a base 16 by means of a rivet 18. In the illustration, the base 16 is vertical and the element 12 is resting on the element 10 by the force of gravity. Of course, in use the principal force on the pulley will come from a flexible element such as a curtain draw cord, and the direction of the force need not be vertical as shown. It will also be noted that there is ample clearance between the elements 10 and 12, and that the only place where contact is made is at the two tangent points nearest the point of application of the force. In theory these are merely points of contact, but in practice they can be considered as short lines of contact because the respective radii of the opposed surfaces are so nearly the same and the material is slightly resilient.

When the member 12 goes off center, and rides up on the taper at one end of member 10, it also rides down the taper at the other end, and this tends to tip the pulley member 12. I have found, however, that the corrective centering action of the tapers is so immediate and constant that this potentially disadvantageous tipping action is actually not a problem at all, and the element 12 will not rub against the base support 16 even when the element 10 extends outwardly of the element 12 by a small amount as shown.

In order to keep element 12 from slipping off element 10, the outer surface of inner race element 10 is provided with an annular bead 20 extending around at the center line of the tapered areas. Outer race member 12 is provided with a complementarily located annular groove 22 in its inner surface. Due to the fact that the inner surface of member 12 does not follow the inverse tapers of member 10, the bead 20 and groove 22 are not in contact when the members 10 and 12 are centered, or even when they are slightly off center. In fact, they are dimensioned to provide ample clearance so as not to touch at all when the pulley is being used under normal operating conditions.

In manufacture, member 10 is molded in a two part mold with its parting line at the center line of the apex of bead 20. This results in a small flash appearing on the ridge of bead 20, but it has no adverse influence on the action of the bearing because the clearance between the bead 20 and the groove 22 is sufficient to accommodate it. In one form of the invention the bead 20 is formed with a flat portion at its apex so that the flash will not contact the surface of the groove 22 even if the elements 10 and 12 are pressed together by heavy pressure applied to element 12.

Element 12 is made in a more complicated mold which need not be described. However, the inner surface of element 12 is formed on an essentially cylindrical mold wall on which there is located a bead which forms groove 22. After molding, the molded part is sufficiently resilient to be removed from the mold despite the presence of this bead in groove 22.

After members 10 and 12 are molded, member 10 is pressed into place in member 12, and thereafter the two members are held loosely by the interlock between bead 20 and groove 22. This effectively makes a single unit out of the combination and is a help in the later manufacturing steps.

It will now be seen that the pulley can be mounted on a supporting base merely by riveting, bolting (or otherwise attaching) the member 10 to the base, and no additional pulley case is needed. Thus in the context of a drapery traverse rod, the pulley can simply be riveted to one wall of the rod, and substantial savings of materials and labor are brought about thereby.

In order to obtain the centering action of the invention, it is not necessary that the inner surface of member 12 (other than groove 22) be exactly cylindrical. It too can be tapered either way and as long as it still establishes an adequate contact point between each of its outer edges and the member 10 when the parts are centered, it will function as intended. In addition, it must not be assumed that the contact points need be sharp points as illustrated. Instead they can be beveled or rounded and they can even represent a fairly extended area. This will be referred to herein as a "substantial point of contact" and the term is intended to include within its meaning both a precise point, and a substantial area surrounding such a precise point.

In addition, the bead 20 and groove 22 need not be precisely as shown. They need not be arcuate in cross section. They may be beveled and have one or more flat areas, and both may be deeper or more shallow or prominent than shown. The limitations here have to do with the functional requirements on the one hand and the problem of removal from the mold on the other. The bead 20 and groove 22 must interlock sufficiently to hold the parts together under conditions of normal use, but they must not be so prominent or indented, as the case may be, to prevent removal from the mold. In addition, the I.D. of the outer race member 12 and the O.D. of the bead 20 must be gaged in relation to the resiliency of the plastic to permit the inner race member 10 to be pressed into the outer race member by a snap fit. Any arrangement of dimensions between the extremes imposed by these requirements is suitable. In addition, the bead 20 may be located on member 12 and groove 22 on member 10 without departing from the spirit of the invention, although doing so presents a more serious problem of removing the parts from the mold.

Accordingly it is not intended that the invention be limited to the precise form herein shown but rather to be measured in terms of the appended claims.

I claim:

1. A self centering pulley comprising a generally cylindrical female outer race member of molded semi-elastic, semi-rigid plastic material having a waxy, low friction surface; a generally cylindrical male inner race member molded of like plastic material, said plastic material being sufficiently resilient with respect to the structural dimensions of said inner and outer race members to permit said inner race member to be forced into said outer race member by a snap fit, said inner race member extending axially beyond said outer race member in each direction, said inner race member being inversely tapered and contacting said outer race member only at substantial points of contact across its axial length toward the outer edges of said outer race member when the inner and outer race member are centered; and means for limiting axial relative motion between said members.

2. The pulley of claim 1 further characterized by the means for limiting relative axial motion comprising a bead on one said member and a complementarily shaped and located groove on the other, with a substantial clearance therebetween when said members are touching at said substantial points of contact.

3. The pulley of claim 2 further characterized by said bead being on the inner race member and said groove in said outer race member.

4. A pulley and support combination comprising a generally cylindrical female outer race member of molded semi-elastic semi-rigid plastic material having a waxy, low friction surface, a generally cylindrical male inner race member molded of like plastic material, said plastic material being sufficiently resilient with respect to the structural dimensions of said inner and outer race members to permit said inner race member to be forced into said outer race member by a snap fit, said inner race member contacting said outer race member only at substantial points of contact across its axial length; loosely interlocking means on said inner and outer race members for limiting axial relative motion between said race members dimensioned in relation to the elasticity of said members to permit said inner race member to be forced into said outer member by a snap fit; a base support for said pulley; and means securing one end of said inner race member to said support.

5. The pulley and support combination of claim 4 further characterized by means for self centering said outer race member on said inner race member in response to forces applied to said outer race member in a direction generally normal to the axis thereof.

6. The pulley and support combination of claim 4 further characterized by said means for limiting axial relative motion comprising a bead on one said race member and a complementarily shaped and located groove on the other said member, and said bead and groove interlocking when said inner member is in place within said outer member.

* * * * *